(12) United States Patent
Roach et al.

(10) Patent No.: US 9,866,487 B2
(45) Date of Patent: Jan. 9, 2018

(54) ADAPTIVE LOAD BALANCER AND METHODS FOR INTELLIGENT DATA TRAFFIC STEERING

(71) Applicant: KEMP Technologies Inc., New York, NY (US)

(72) Inventors: Simon Roach, Ottobrunn (DE); Reinhold Müller, Markt Indersdorf (DE)

(73) Assignee: KEMP Technologies Inc., New York, NY (US)

( * ) Notice: Subject to any disclaimer, the term of this patent is extended or adjusted under 35 U.S.C. 154(b) by 261 days.

(21) Appl. No.: 14/730,456

(22) Filed: Jun. 4, 2015

(65) Prior Publication Data

US 2015/0358236 A1  Dec. 10, 2015

Related U.S. Application Data

(60) Provisional application No. 62/008,142, filed on Jun. 5, 2014, provisional application No. 62/117,722, filed on Feb. 18, 2015.

(51) Int. Cl.
*H04L 12/803* (2013.01)
*H04L 12/26* (2006.01)
(Continued)

(52) U.S. Cl.
CPC ........ *H04L 47/125* (2013.01); *H04L 41/0896* (2013.01); *H04L 43/062* (2013.01); *H04L 43/065* (2013.01); *H04L 47/22* (2013.01)

(58) Field of Classification Search
CPC . H04L 41/0896; H04L 43/065; H04L 47/125; H04L 47/22; H04L 41/5003; H04L 43/062
(Continued)

(56) References Cited

U.S. PATENT DOCUMENTS 6,542,964 B1   4/2003   Scharber .................... 711/122
6,578,066 B1   6/2003   Logan et al. ................ 709/105
(Continued)

OTHER PUBLICATIONS

The Notification of Transmittal of the International Search Report and the Written Opinion of the International Searching Authority, or the Declaration, in English, dated May 6, 2016, the International Search Report, in English, dated May 6, 2016, and the Written Opinion of the International Search Authority, in English, dated May 6, 2016, which were issued by the International Bureau of WIPO in international PCT application having Serial No. PCT/US16/18174, filed on Feb. 17, 2016, which corresponds to Applicant's continuation-in-part application, U.S. Appl. No. 15/045,437, filed Feb. 17, 2016.

(Continued)

*Primary Examiner* — Mark Rinehart
*Assistant Examiner* — Kokou R Detse
(74) *Attorney, Agent, or Firm* — Bodner & O'Rourke, LLP; Gerald T. Bodner; Christian P. Bodner

(57) ABSTRACT

An adaptive load balancer intelligently steers data traffic through a software defined network (SDN) to which the load balancer is operatively coupled. The network has egress ports to which a plurality of servers is connected. The network has an SDN controller which generates statistical information concerning the network. The adaptive load balancer includes a weighted round robin scheduler module which receives client requests and, based on the statistical information generated by the SDN controller, determines a weight to be attributed to each server of the plurality of servers connected to the network. The adaptive load balancer operates in a passive port mode, a passive path mode, an active path mode and an active path with quality of service (QoS) overlay mode.

4 Claims, 16 Drawing Sheets

(51) Int. Cl.
*H04L 12/815* (2013.01)
*H04L 12/24* (2006.01)

(58) Field of Classification Search
USPC .......................................................... 370/235
See application file for complete search history.

(56) References Cited

U.S. PATENT DOCUMENTS

| | | | |
|---|---|---|---|
| 7,454,500 B1 | 11/2008 | Hsu et al. | 709/226 |
| 7,581,009 B1 | 8/2009 | Hsu et al. | 709/226 |
| 7,584,262 B1 | 9/2009 | Wang et al. | 709/217 |
| 7,653,722 B1 * | 1/2010 | Krishna | G06F 17/30902 709/224 |
| 8,769,541 B2 | 7/2014 | English et al. | 718/104 |
| 2004/0210663 A1 | 10/2004 | Phillips et al. | 709/230 |
| 2005/0018682 A1 | 1/2005 | Ferguson et al. | 370/392 |
| 2005/0047415 A1 | 3/2005 | Channegowda et al. | 370/395.4 |
| 2005/0091396 A1 | 4/2005 | Nilakantan et al. | 709/232 |
| 2005/0198335 A1 | 9/2005 | Brown et al. | 709/229 |
| 2006/0155862 A1 | 7/2006 | Kathi et al. | 709/229 |
| 2007/0226294 A1 | 9/2007 | Pruitt et al. | 709/203 |
| 2008/0025230 A1 | 1/2008 | Patel et al. | 370/252 |
| 2009/0119396 A1 | 5/2009 | Kanda | 709/223 |
| 2011/0235508 A1 | 9/2011 | Goel et al. | 370/230 |
| 2014/0040478 A1 | 2/2014 | Hsu et al. | 709/226 |
| 2014/0207968 A1 | 7/2014 | Kumar et al. | 709/244 |
| 2014/0369204 A1 * | 12/2014 | Anand | H04L 47/125 370/235.1 |
| 2015/0081762 A1 * | 3/2015 | Mason | H04L 47/21 709/203 |

OTHER PUBLICATIONS

Notification of Transmittal of the International Search Report, the International Search Report and the Written Opinion of the International Searching Authority (in English), dated Oct. 16, 2015, issued from Applicant's corresponding PCT Application No. PCT/US2015/034193, filed on Jun. 4, 2015, from the International Searching Authority at the U.S. Patent and Trademark Office.

* cited by examiner

Memory representation of scheduling table: (Mode 1 and 2)

| Target | Base Weight | Adaptive Weight | Resulting Weight |
|---|---|---|---|
| 1 | 1000 | =f(network load[target 1]) | =F(Base Weight, Adaptive Weight) |
| 2 | 1000 | =f(network load[target 2]) | =F(Base Weight, Adaptive Weight) |
| 3 | 1000 | =f(network load[target 3]) | =F(Base Weight, Adaptive Weight) |
| 4 | 500 | =f(network load[target 4]) | =F(Base Weight, Adaptive Weight) |

ADAPTIVE LOAD BALANCER AND METHODS FOR INTELLIGENT DATA TRAFFIC STEERING

CROSS REFERENCE TO RELATED APPLICATIONS

This application is related to U.S. Provisional Application Ser. No. 62/008,142, filed on Jun. 5, 2014, and entitled "Adaptive Load Balancer Using Software Defined Network (SDN) For Server Data Congestion Avoidance" and U.S. Provisional Application Ser. No. 62/117,722, filed on Feb. 18, 2015, and entitled "Adaptive Load Balancer And Methods For Intelligent Data Traffic Steering", the disclosure of each of which is incorporated herein by reference and on which priority is hereby claimed.

BACKGROUND OF THE INVENTION

Field of the Invention

The present invention relates to load balancer devices and structure for controlling the operation of a plurality of servers. This invention further relates generally to data communications, and more specifically, to systems and methods to dynamically load balance servers.

Description of the Related Art

Network traffic densities are increasing constantly. The adoption of Software Defined Network (SDN) technology is on the rise for the powerful control it offers over network infrastructure. It is a matter of time before it becomes a part of mainstream adoption. There will be a transitional period in which elements of SDN are used alongside traditional networking technologies and newer overlay solutions. As SDN adoption continues, load balancers will play a critical role in providing the required intelligence for flexible and increasingly effective network deployments.

More specifically, load balancing is a process of allocating a plurality of client sessions among a plurality of server resources. The goals of load balancing will typically include some combination of maximizing throughput, improving resource utilization, and minimizing average response time. In addition, the ability to load balance among multiple servers will increase reliability through redundancy. If one or more servers should prove unreliable, load balancing can direct client sessions to other remaining reliable servers. Load balancing is commonly used to distribute tasks across a pool of web servers according to various scheduling algorithms. An apparatus that performs the load balancing according to a scheduling algorithm is referred to as a "load balancer."

One such scheduling algorithm used by a load balancer for apportioning work among a pool of web servers is round-robin scheduling. In round-robin scheduling, sessions are distributed in equal number to each web server in circular order. Although round-robin scheduling equalizes the number of requests sent to each web server, congestion in the underlying data network connections to each of the servers can vary, resulting in unpredictable delays in response time. Thus, although the number of provided requests is equalized among the web servers, the costs are not equally distributed. Consequently, even though each of the web servers is allocated the same number of requests, the work queue for some web servers may grow long while other web servers may have few requests in their respective queues. Because response time is roughly proportional to the number of requests in a queue, the average response time will suffer when the number of queued requests becomes unequally distributed among web servers.

In traditional networks there is no end-to-end visibility of network paths, and application traffic is not always routed optimally. More specifically, in conventional networks with load balanced servers, including those that are software defined and controlled by an SDN (software defined network) controller, the load balancer looks at the data traffic congestion at the servers and does not take into account the congestion through the network itself. For example, a path through the network, or a network egress port to which a server is connected, may be overloaded with client requests and server responses thereto. The round robin sequencing, or even a weighted round robin sequencing which is based in part on the data traffic capabilities of the individual servers, performed by conventional load balancers, do not factor in the response times or propagation delays through the network or data velocity at the network egress ports.

An SDN controller generates statistical information from which such data traffic congestion through the network may be derived. However, heretofore, no conventional load balancer taps this statistical information from the SDN controller to provide adaptive load balancing which dynamically adjusts to changing data traffic congestion through the network for intelligent data traffic steering.

OBJECTS AND SUMMARY OF THE INVENTION

It is an object of the present invention to provide a system and method which alleviate or avoid data congestion experienced by a plurality of servers controlled by a load balancer in conventional systems.

In accordance with the present invention, the Load Balancer, integrated with the SDN Controller solution, solves the aforementioned problem by making available critical flow-pattern data. In this way, applications can be routed dynamically across the most optimal server and switching infrastructure.

An adaptive load balancer formed in accordance with the present invention intelligently steers data traffic through a software defined network (SDN) to which the load balancer is operatively coupled. The network has egress ports to which a plurality of servers is connected. The network has an SDN controller which generates statistical information concerning the network. The adaptive load balancer includes a weighted round robin scheduler module which receives client requests and, based on the statistical information generated by the SDN controller, determines a weight to be attributed to each server of the plurality of servers connected to the network. The adaptive load balancer operates in a passive port mode, a passive path mode, an active path mode and an active path with quality of service (QoS) overlay mode.

The Load Balancer-SDN Controller combined solution of the present invention enables: 1) Application visibility to network; 2) Network data being "pulled" by the load balancer; 3) Adaptive High Availability load balancing; and 4) Dynamic application delivery.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

The system and method of the present invention provide intelligent traffic steering through an SDN controlled network using what applicant refers to as a "passive port" method, a "passive path" method, an "active path" method and an "automated QoS control" or "QoS overlay" method, each being in accordance with the present invention. Each of these methods of the present invention, and the systems of the present invention for carrying out these methods, will be described in detail.

"Intelligent traffic steering", as its name implies, is a method that, through an adaptive load balancer 2 which uses software defined network (SDN) logic or is coupled to an SDN controller 4, can alleviate or avoid data congestion experienced by a plurality of servers 6. Load balancing, using an SDN controller 4, can obtain reliable and accurate data in real-time with regard to the traffic dynamics of the physical server network 8. By aggregating this with data on the dynamics of the logical network 8 and application that a load balancer 2 (also referred to herein as an Application Delivery Controller, or ADC) controls, one is able to obtain a truly holistic view and make more intelligent traffic forwarding decisions than in a conventional load balanced server system that does not employ SDN logic or does not communicate with an SDN controller 4. Broadly, the system and method of the present invention can elect to steer application specific traffic around congested parts of the server network 8 using passive or active avoidance through an interaction with the SDN controller 4, or can preempt congestion by actively arbitrating the traffic, driven by application specific policies that are injected into the network via the SDN controller 4.

Figure 1:
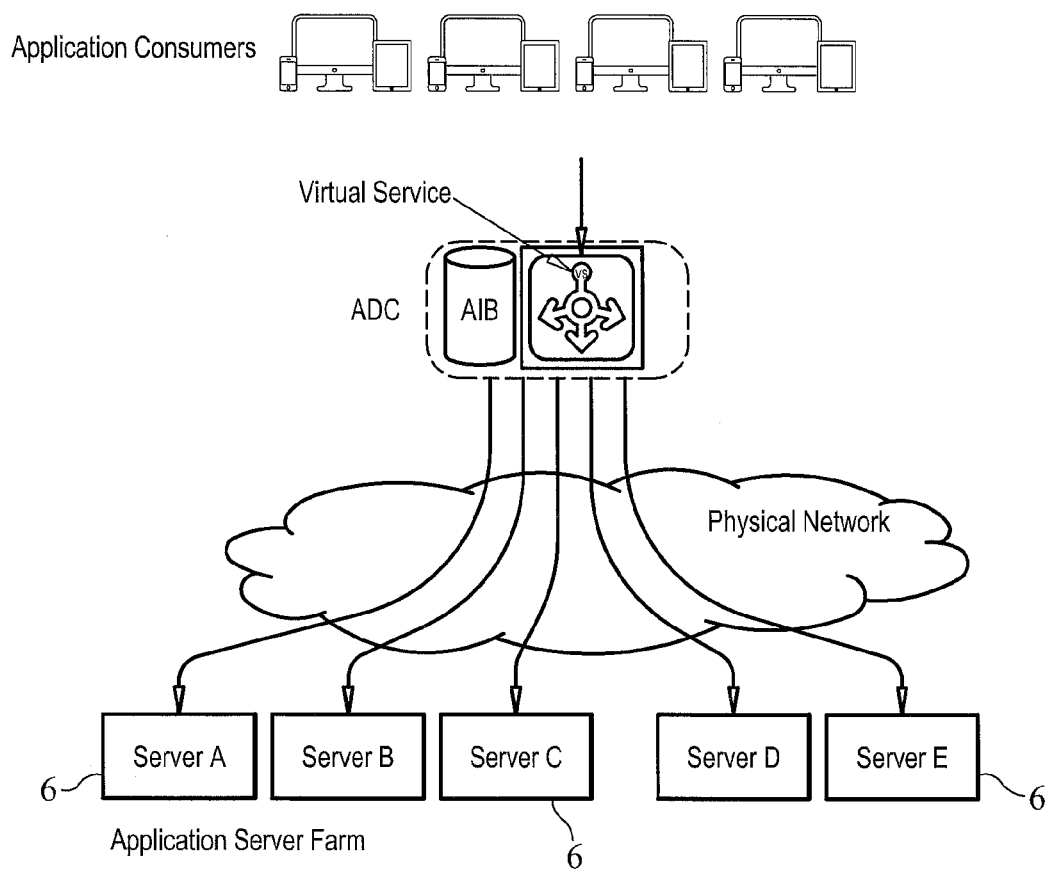
FIG. 1 is a block diagram of a conventional system having a plurality of servers and a load balancer which routes incoming traffic to the most "appropriate" server.

In a conventional load balanced server network, such as shown in FIG. 1 of the drawings, the load balancer forwards incoming traffic (e.g., video data, voice data, and the like) to the most "appropriate" server 6. The system creates an illusion of a single, highly flexible application server that provides a continuous and consistent quality of service (QoS). However, the conventional load balanced server system lacks holistic network visibility and may lead to poor allocation of capital and operational resources, that is, servers 6 may have to be added to keep up with the traffic load. Such load balanced server systems do not have the "intelligence" that the adaptive load balancer 2 and method of the present invention provide.

As mentioned previously, there are four methods and systems for intelligent traffic steering in accordance with the present invention which are described herein, that is, a "passive port" method, a "passive path" method, an "active path" method and a "QoS overlay" or "automated QoS control" method.

Figure 3:
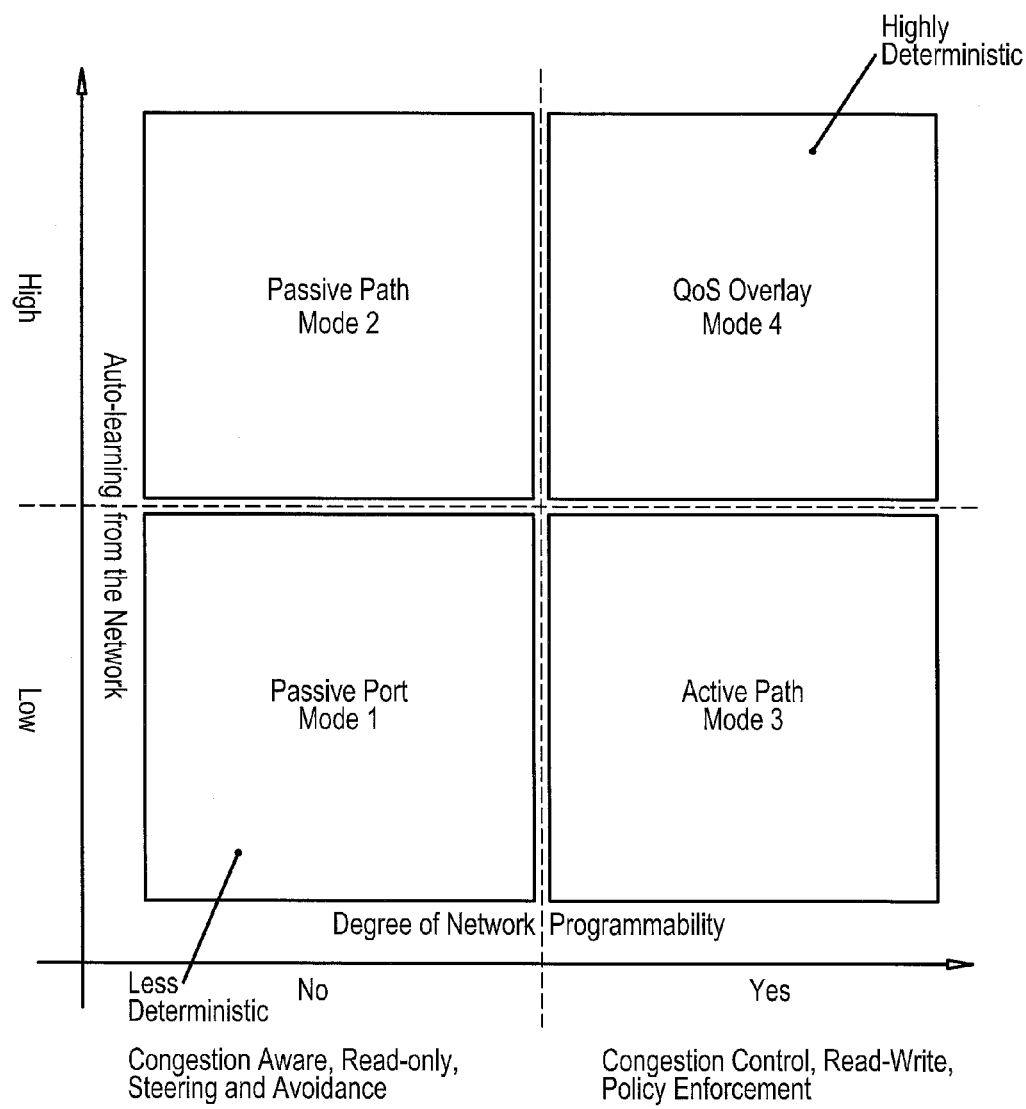
FIG. 3 is a graphical depiction of, generally, the efficacy of four different methods of intelligent traffic steering in accordance with the present invention for alleviating or avoiding data congestion experienced by a plurality of servers and controlled by a load balancer.

Before describing each intelligent traffic steering method in detail, reference should be had to FIG. 3 of the drawings. Here, a graph is shown, which compares the characteristics of each of the four methods of intelligent traffic steering of the present invention. As can be seen in the graph of FIG. 3, the abscissa represents the degree of network programmability, and the ordinate represents auto-learning from the server network. The passive port method provides a less deterministic method of intelligent traffic steering than certain of the other methods, such as the QoS overlay method, which is a highly deterministic method of intelligent traffic steering. The passive port method does not leverage network programmability, compared to the active path method and the QoS overlay method of the present invention. More specifically, the passive port method provides congestion awareness and read-only traffic steering and congestion avoidance, and relatively low auto-learning from the network 8. This should be compared to the active path method, which provides network programmability and congestion control, and read-write and policy enforcement in intelligent traffic steering. But, the active path method, like the passive port method, provides a relatively low auto-learning from the network 8.

The passive path method of the present invention, on the other hand, provides a high degree of auto-learning but, like the passive port method, no network programmability. The QoS overlay method provides, by far, the most intelligent traffic steering of all of the systems, with a high auto-learning capability and providing a high degree of network programmability. Each of the four methods of intelligent traffic steering, and the systems for carrying out such methods, will now be described.

Figure 11:
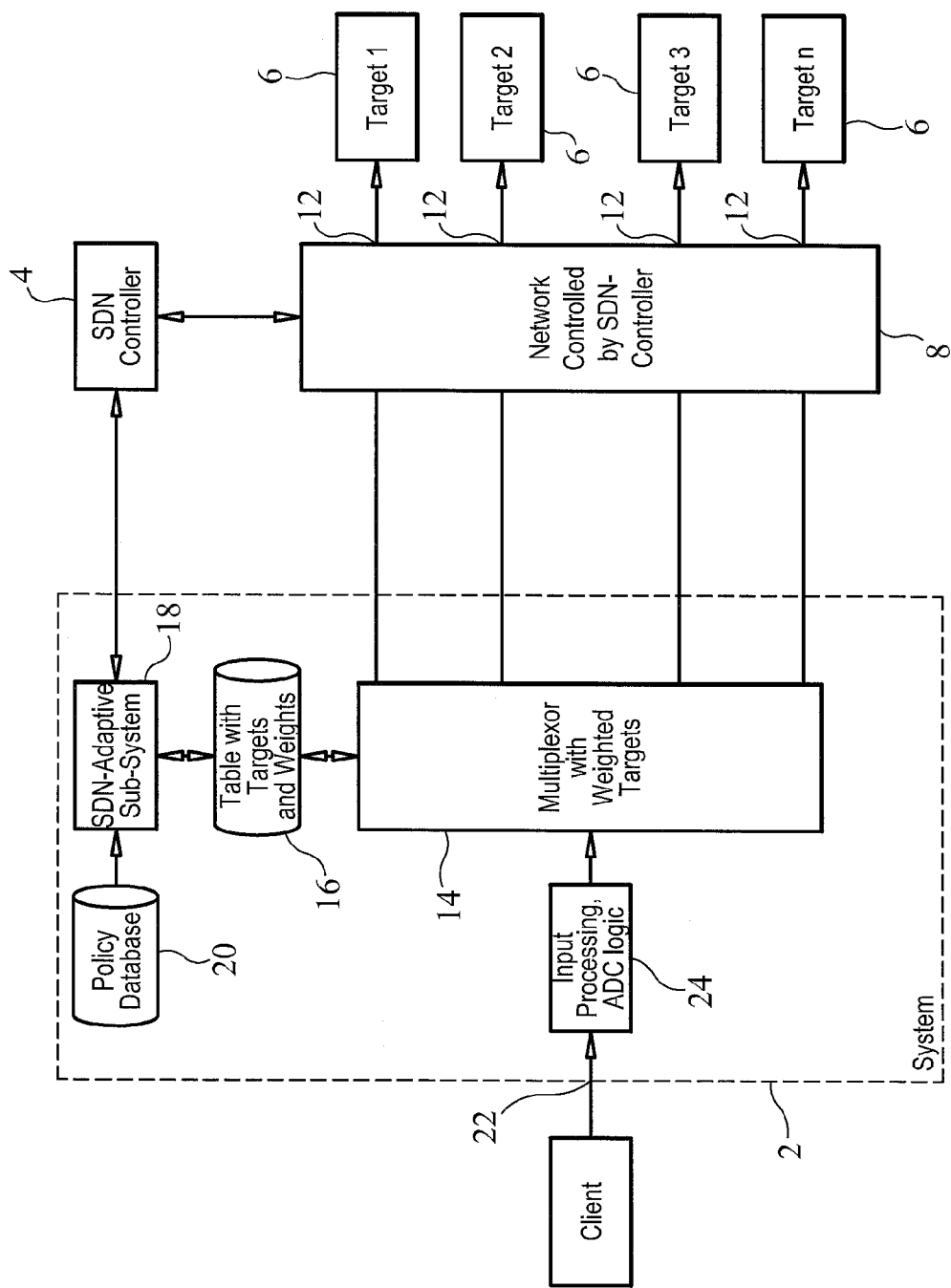
FIG. 11 is a block diagram of the architecture of a network and an adaptive load balancer foamed in accordance with the present invention which intelligently and dynamically steers data traffic through the network based on statistical information received from an SDN controller.
Figure 12:
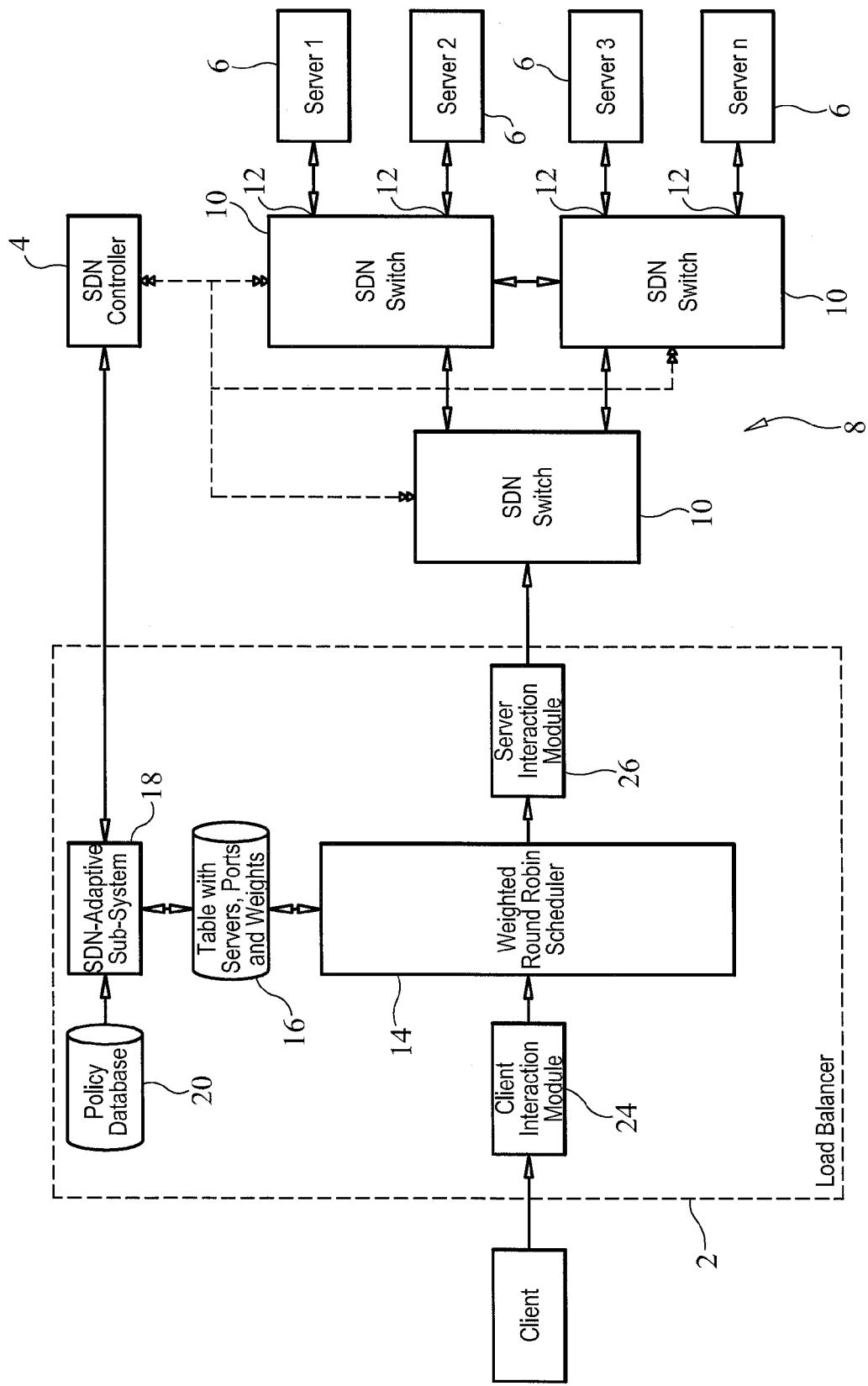
FIG. 12 is an alternative block diagram of the network architecture, including the adaptive load balancer of the present invention, shown in FIG. 11.
Figures 13, 14:
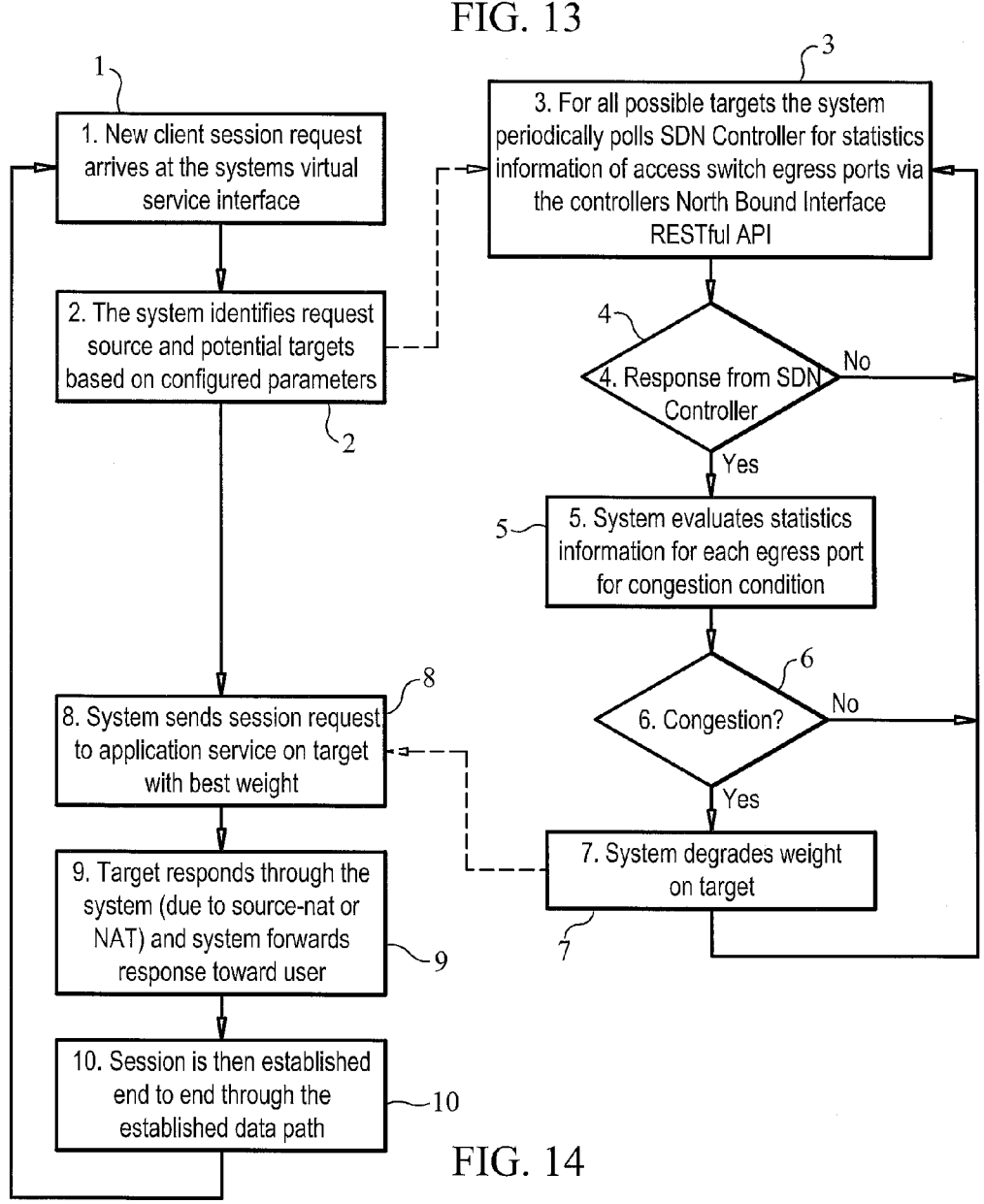
FIG. 13 is a chart showing an example of the memory representation of the scheduling table forming part of the adaptive load balancer of the present invention for use with the passive port method and the passive path method of intelligent data traffic steering of the present invention.
FIG. 14 is a flow chart illustrating the "passive port" method of intelligent data traffic steering formed in accordance with the present invention.

Reference first should be had to FIGS. 11-13 of the drawings for an overview of how an adaptive load balancer 2 formed in accordance with the present invention functions and how the load balancer 2 is connected to a software defined network (SDN) 8, and further how the adaptive load balancer 2 receives statistical information from the SDN controller 4 of the network 8 to determine data traffic congestion through the network 8, which information is factored in and used in determining where client requests should be directed through the network 8 to a particular server 6 connected thereto for intelligent traffic steering.

Certain terms used herein, in reference to FIGS. 11-13, will now be defined. A "client" refers to the system originating the TCP/IP network requests, also referred to herein simply as "client requests". The "system" is that which is used to control how requests are distributed to the various targets, and is also referred to herein as an ADC (Application Delivery Controller), or more colloquially known as a "load balancer" 2.

The "target", shown in FIG. 11, represents the computer system that will respond to the client requests, usually identified by its IP address. The term "target" used herein and shown in FIG. 11 is synonymous with the server or servers 6 shown in FIG. 12 and also referred to herein.

The term "network fabric" used herein refers to the network to handle TCP/IP packets, and is usually Ethernet based. An "SDN controller" 4 refers to the active elements in the network 8 that are externally controlled by this system. The SDN controller 4 controls the operation of the SDN switches 10 forming part of the network 8 (see FIG. 12), which directs client requests and return path traffic to and from various targets, or servers 6, connected to different "egress ports" 12 of the network 8.

The "multiplexor" shown in FIG. 11 refers to the core part of the system, or load balancer 2, that dispatches the client requests to the many targets (i.e., servers 6) based on a weighted round robin algorithm within the load balancer. The multiplexor is depicted in FIG. 12 as the "weighted round robin scheduler" 14.

The "table" 16 shown in FIGS. 11 and 12 is, essentially, a memory that stores the number of available targets (i.e., servers 6) with static and dynamically calculated weights for each. Statistical information generated by the SDN controller 4 is received by the adaptive load balancer 2 and entered into the table 16, along with the server information, information concerning the egress ports 12 of the network 8, and weights that are pre-configured based on the capabilities' of the various servers 6 connected to the network 8.

The "SDN-adaptive subsystem" 18 refers to a component of the adaptive load balancer 2 of the present invention which influences the dynamic weights in the table 16 based on statistical data collected from the SDN controller 4. The load balancer 2 uses the statistical information received from the SDN controller 4 to optimize data flow through the network 8 to specific targets, or servers 6, based on criteria in the policy database 20.

The "policy database" 20 is a database forming part of the adaptive load balancer 2 of the present invention that provides additional input to the SDN-adaptive subsystem 18, for example, whether to optimize for latency or for throughput.

In general, and still referring to FIGS. 11-13, a client request (from a client, such as a laptop computer or a PC external to the network 8 but connected thereto through an Internet connection or an Ethernet connection, for example) is received by a virtual port 22 defined by the adaptive load balancer 2 and is provided to a client interaction module 24 within the balancer 2. More specifically, the client interaction module 24 receives the client requests, which are generally IP based and have a destination address and port, protocol information and other information concerning the request. This client request is provided to the weighted round robin scheduler 14 (see FIG. 12) or multiplexor (see FIG. 11). The weighted round robin scheduler 14 is basically an algorithm that acts upon the client requests received by the load balancer 2 and will change (or provide the client request to the server interaction module 26 shown in FIG. 12 to change) the destination address of the client request based on server congestion, pre-configured weights attributed to the different servers 6 connected to the network 8 and dynamic statistical information received from the SDN controller 4.

More specifically, the weighted round robin scheduler 14 looks to the memory (the "table" 16) having information concerning the targets or servers 6, the egress ports 12 and certain pre-configured weights, as well as the statistical information concerning the network 8 that is received from the SDN controller 4 and which dynamically changes. The pre-configured weights which are stored in the memory, or table 16, of the load balancer 2 relates to the capabilities of the various servers 6 connected to the egress ports 12 of the network 8. For example, server or target 1 may have 12 CPU cores, whereas server or target 2 may have 24 CPU cores, and have twice the capability of handling data traffic than that of target or server 1.

For example, if all of the servers 6 connected to the network 8 have the same capability, the round robin scheduler of a conventional load balancer would direct client requests, or packets of client requests, sequentially to target or server 1, then target or server 2, then target or server 3, continually through target or server n, and then return to target or server 1. A weighted round robin scheduler 14, on the other hand, will take into account the capabilities of each individual server 6 connected to the network 8 and will provide a "base weight" to each client request or packet of client requests to direct the client requests or packets through the network 8 to the targets or servers 6 connected thereto.

In the adaptive load balancer 2 of the present invention, the weighted round robin scheduler 14, or multiplexor, forming part of the load balancer, takes into account when scheduling where client requests should be directed not only the capabilities of the individual servers 6 connected to the network 8 but also the dynamic conditions of the network 8 and the data traffic congestion therethrough, based on the statistical information received from the SDN controller 4. Thus, the adaptive load balancer 2 of the present invention may determine, in real time, how busy not only the servers 6 are but also the paths through and egress ports 12 of the network 8.

This statistical information from the SDN controller 4 provides information such as how much capability is available for each server 6, the data velocity through the egress ports 12 of the network 8 to which the targets or servers 6 are connected, and other information concerning the paths through the various multiple switches 10 of the network 8 from which propagation delays and data congestion through the network paths and at the egress ports 12 of the network 8 may be derived. For example, the weighted round robin scheduler 14 may determine, from this dynamic statistical information received from the SDN controller 4 and the pre-configured weights of the targets or servers 6 stored in the memory (the table 16), a running average of the available bandwidth through the network 8, at the egress ports 12 thereof and that of the various servers 6 connected to the network 8.

In response to the information it receives, the weighted round robin scheduler 14 (or the server interaction module 26 shown in FIG. 12) will change the destination address and port of the client request or packets of client requests to direct the client requests or packets through the network 8 to the various egress ports 12 of the network 8 and to select targets or servers 6 connected to the egress ports 12.

FIG. 13 illustrates an example of the scheduling table 28 provided by the weighted round robin scheduler 14 of the adaptive load balancer 2 of the present invention. The table 28 shows that a base weight is assigned to each target or server 6 connected to the network 8, based on the capability of each individual server 6, and then an adaptive weight is included for each target or server 6, which represents the network load, or data traffic congestion through the network 8. This adaptive weight is based on the statistical information received from the SDN controller 4. The adaptive load balancer 2 polls the SDN controller 4 periodically and receives dynamic information concerning data traffic congestion through the network 8, and this information is factored into the weight which is assigned to each server 6 or target connected to the network 8. The resulting weight assigned to each target or server 6 is a function of the base weight and the adaptive weight.

The client requests, or packets of client requests, are provided to the server interaction module 26 of the load balancer 2. It is preferably here that the destination addresses of the client requests are changed based on the determinations made by the weighted round robin scheduler 14. The server interaction module 26 provides the client requests, or packets of client requests, to the SDN switch or multiple SDN switches 10 that are controlled by the SDN controller 4, all of which form part of the network 8, which, based on the destination addresses of the client requests, direct the client requests to the various egress ports 12 of the network 8 and to the targets or servers connected thereto. It should be understood that congestion in the return path, that is, from each individual target or server 6, and through the network 8, is also monitored by the adaptive load balancer 2 of the present invention.

Figure 2:
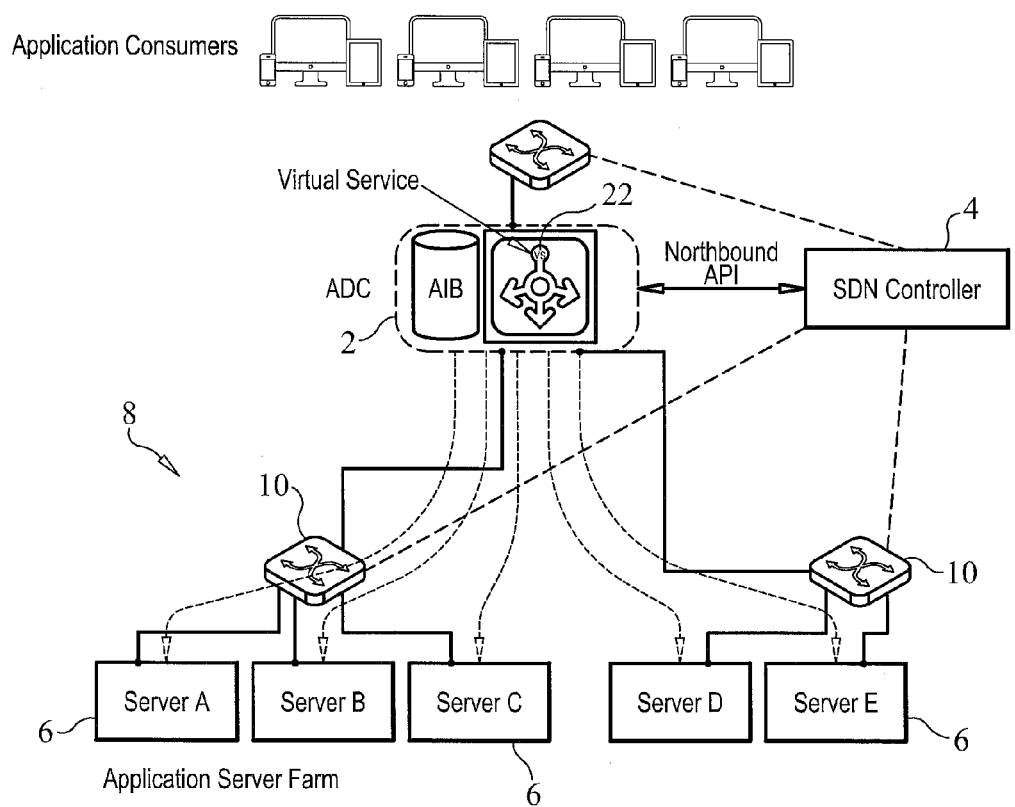
FIG. 2 is a block diagram of a system formed in accordance with the present invention for alleviating or avoiding data congestion experienced by a plurality of servers controlled by a load balancer in the conventional system shown in FIG. 1.

A general block diagram of a system incorporating an adaptive load balancer 2, which communicates with an SDN controller 4, for carrying out the four methods of intelligent traffic steering of the present invention is shown in FIG. 2 of the drawings. Since the load balancer 2 operates chiefly at the L4-L7 layer of the network 8, it is in a prime location to influence the SDN controller 4 such that upper layer intelligence can be "pushed" to the SDN controller 4 from the load balancer 2, helping it to make better decisions. Furthermore, circuit information can be "pulled" from the SDN controller 4 across the North Bound Interface (NBI). This allows the load balancer 2 to make better application load balancing decisions by aggregating its native application intelligence with the information provided by the SDN controller 4. The methods of the present invention described herein provide a robust mapping between logical and physical networks, and uses the North Bound API (Application Program Interface) to enrich the application information base (AIB) with performance and health characteristics (i.e., such as how many packets of data have been corrupted or dropped) of the physical network 8. The methods of the present invention provide better traffic forwarding decisions.

As shown in FIG. 2 of the drawings, the adaptive load balancer 2 of the present invention, communicating with the SDN controller 4, directs the SDN controller 4 to activate the SDN switches 10 to direct traffic to one or more servers 6, and appears as a virtual service 22 to the application consumers connected thereto. The solid lines in the block diagram of FIG. 2 show how data is steered to and from the servers 6 by the SDN controller 4 controlling (shown by dashed lines) the SDN switches 10, with input from the adaptive load balancer 2 of the present invention communicating therewith.

Figure 10:
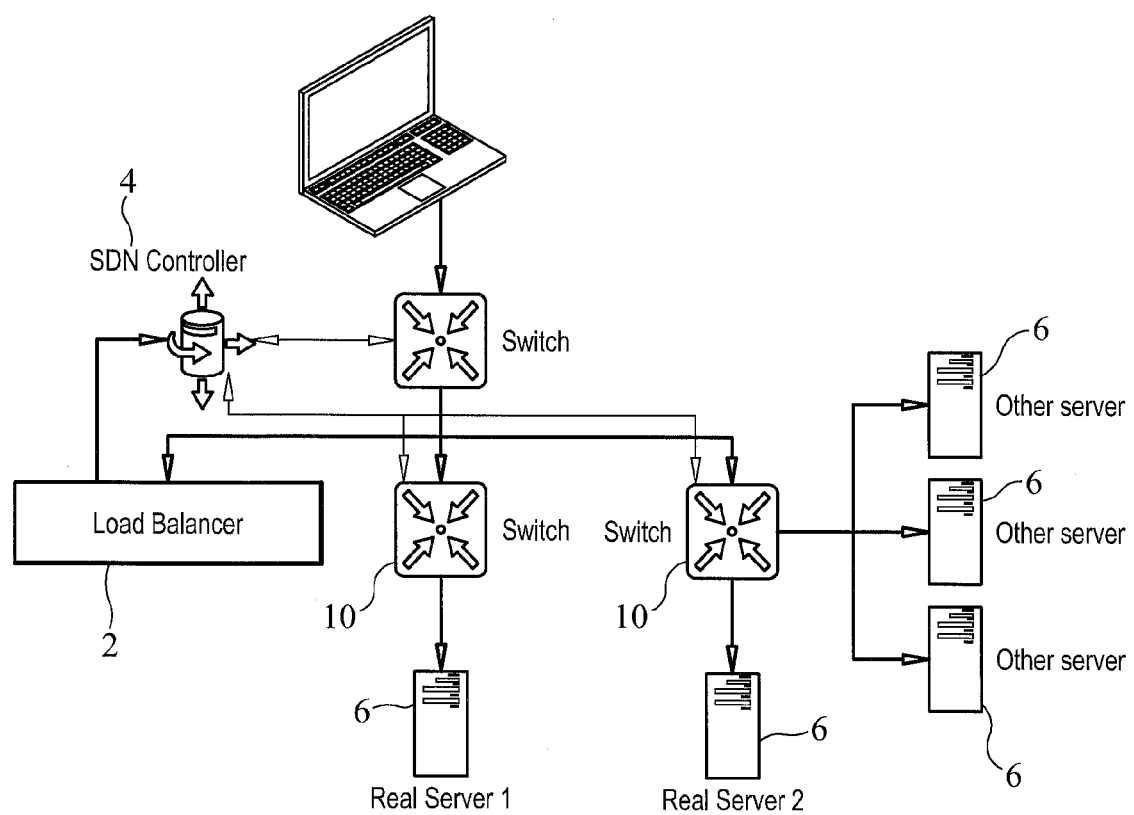
FIG. 10 is a block diagram of a system formed in accordance with the present invention for alleviating or avoiding data congestion experienced by a plurality of servers controlled by a load balancer.

One form of the system of the present invention is shown in FIG. 10. The principles of SDN are focused on the lower layers of the network 8, and load balancers operate chiefly at L4-L7. This puts load balancers in a prime location to bridge the gap that exists between the application and the network 8 to influence the SDN controller 4. Upper layer intelligence can be "pushed" to the SDN controller 4 from the load balancer 2, helping it to make better decisions.

Inversely, circuit information can be "pulled" from the SDN controller 4 across the North Bound Interface (NBI). This allows the load balancer 2 to make better application load balancing decisions by aggregating its native application intelligence with the information provided by the SDN controller 4. The solution of the present invention focuses on the latter as a first step to SDN adaptive load balancing.

An important augmentation benefit of the load balancer-SDN controller combined solution of the present invention is to improve performance of a new application across existing infrastructure. The adaptive load balancer 2 apps' RESTful API allows for third-party innovation within the SDN controller topology, so that customized solutions can be tailored to specific enterprise network needs.

The SDN controller 4 has direct access to the lower layer circuit and the flow metrics that the load balancer does not see. The load balancer has visibility of the upper layer application-level information (request load time, SSL TPS, application response throughput, etc.). In this initial phase of integration, the load balancer 2 pulls information across the NBI, extending its visibility by adding the circuit information received from the SDN controller 4.

The application instance target responds appropriately to the health query that the load balancer 2 is executing. In case of congestion, the load balancer 2 is made aware of it by the SDN controller 4. The load balancer's algorithm will then choose the next appropriate target that has the quickest performing end-to-end path.

In a non-SDN environment, the load balancer is a layer 4-7 device and has no visibility of the lower layer conditions of the individual switching infrastructure. In the SDN environment, the load balancer 2 pulls network statistical information from the SDN controller 4 and utilizes it to make more intelligent load balancing decisions on behalf of clients attempting to access application services. By pulling that information from the SDN controller 4, the load balancer 2 has much better information to make load balancing decisions.

Figure 4:
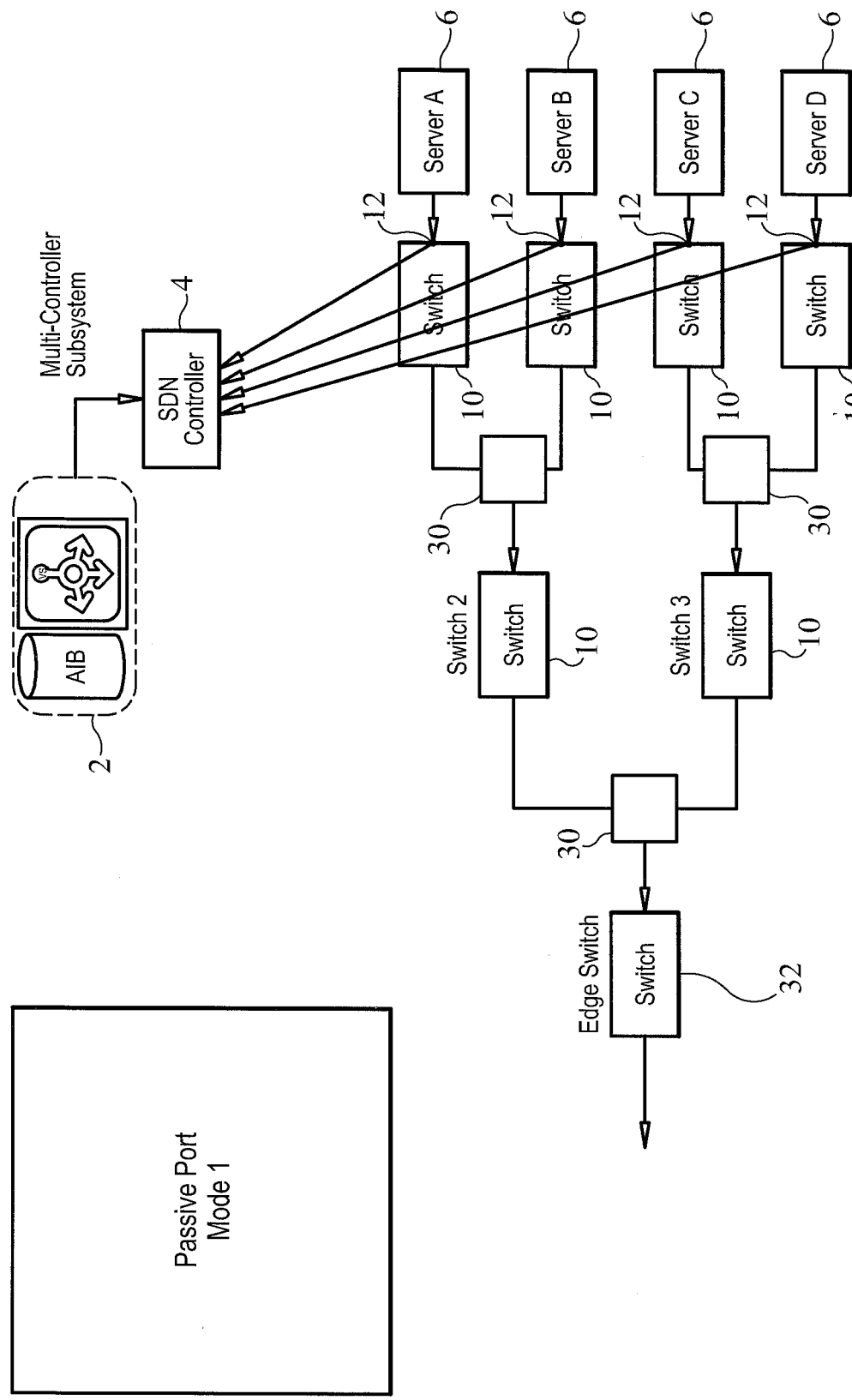
FIG. 4 is a simplified block diagram of a first form of a system constructed in accordance with the present invention which carries out "passive port" intelligent traffic steering, referred to in FIG. 3 of the drawings.

A block diagram of a system for carrying out the "passive port" method of intelligent traffic steering in accordance with the present invention is shown in FIG. 4 of the drawings. Basically, the congestion level of the port 12 closest to the server 6 negatively impacts the decision to forward the next connection to that server 6. That is, if a port 12 is saturated, the adaptive load balancer 2 will reduce the traffic to it.

As can be seen from FIG. 4, the adaptive load balancer 2 provides control input to the SDN controller 4 which, in turn, controls the network switches 10 coupled to the servers 6. The blocks shown in the diagram between the switches 10 may be embodied as intelligent IT structures 30, such as firewalls (FW), Intrusion Prevention System (IPS), Spam control, and Application Delivery Controllers (ADC), also known as load balancers. It should be realized, of course, that the adaptive load balancer 2 may provide input to multiple SDN controllers 4 in the server network 8.

Reference should now be had to FIG. 14 of the drawings, which shows a flow chart illustrating the operation of the system of the present invention in accordance with the "passive port" method. In the passive port method, a user session request arrives at the virtual service interface 22 of the system (Step 1). The system identifies the request source and potential targets (i.e., servers 6) based on configured parameters, such as the destination application information, the 5 tuple information and the subscriber or tenant ID information (Step 2).

For all possible targets (i.e., servers 6), the system periodically polls the SDN controller 4 for statistical information of access switch egress ports 12 (i.e., the network ports) via the controller's North Bound Interface (NBI) RESTful API (Step 3). Then, the system checks if the SDN controller 4 responds within a specific time-out (Step 4).

If the SDN controller 4 did respond, then the system evaluates the statistical information for each egress port 12 for congestion conditions (Step 5). The system then checks to see if congestion exists (Step 6).

If egress port congestion exists, then the system degrades or changes the weight for that specific target or server 6 connected to the egress port 12 (Step 7).

The system then sends session requests to the application service on the target or server 6 with the best weight (Step 8). The target or server 6 responds through the system (due to source-nat, or NAT), and the system then forwards the response toward the user (Step 9). The session is then established end-to-end through the data path of the network 8 determined by the adaptive load balancer 2 of the present invention (Step 10).

Figure 5:
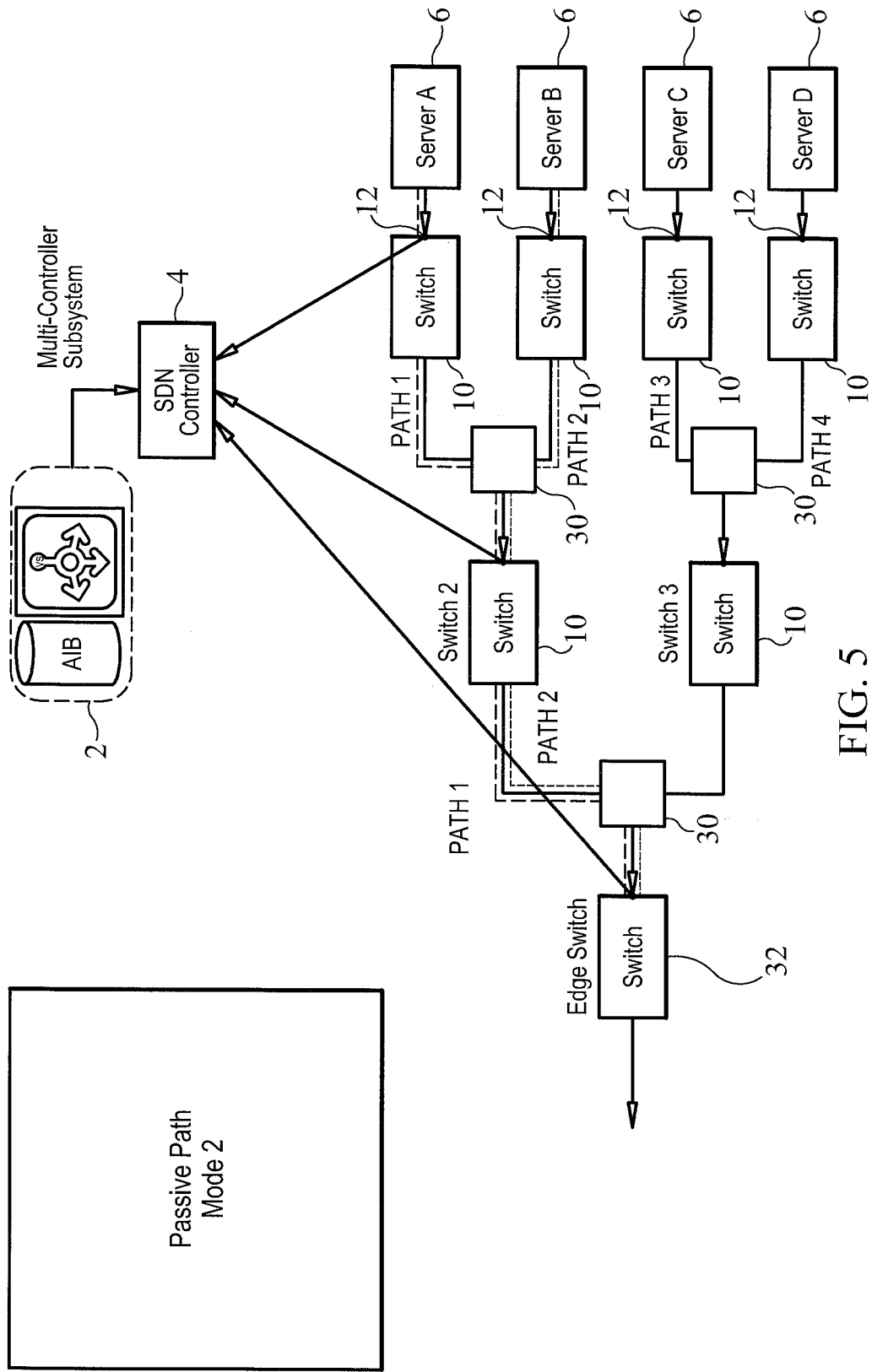
FIG. 5 is a simplified block diagram of a second form of a system constructed in accordance with the present invention which carries out "passive path" intelligent traffic steering, referred to in FIG. 3 of the drawings.

FIG. 5 is a block diagram of an adaptive load balancer, SDN-controlled server network for carrying out the "passive path" method of intelligent traffic steering in accordance with the present invention. As mentioned previously with respect to a description of the "passive port" method, the congestion level of the network path leading to a server 6 negatively impacts the decision to forward the next connection to that server 6. Hence, a congested path receives less traffic. With the "passive path" method of the present invention, the SDN controller 4, guided and influenced by the adaptive load balancer 2, installs the flows of traffic between the load balancer 2 and the server 6. In other words, rather than controlling the port 12 where traffic is directed, with this method of the present invention, the path through the network 8 from the server 6 to the edge switch 32 is controlled by the SDN controller 4, with guidance from the adaptive load balancer 2. Again, the blocks between different layers of switches represent intelligent IT structure 30, such as firewalls, IPS, Spam control and ADC (load balancers).

Figure 15:
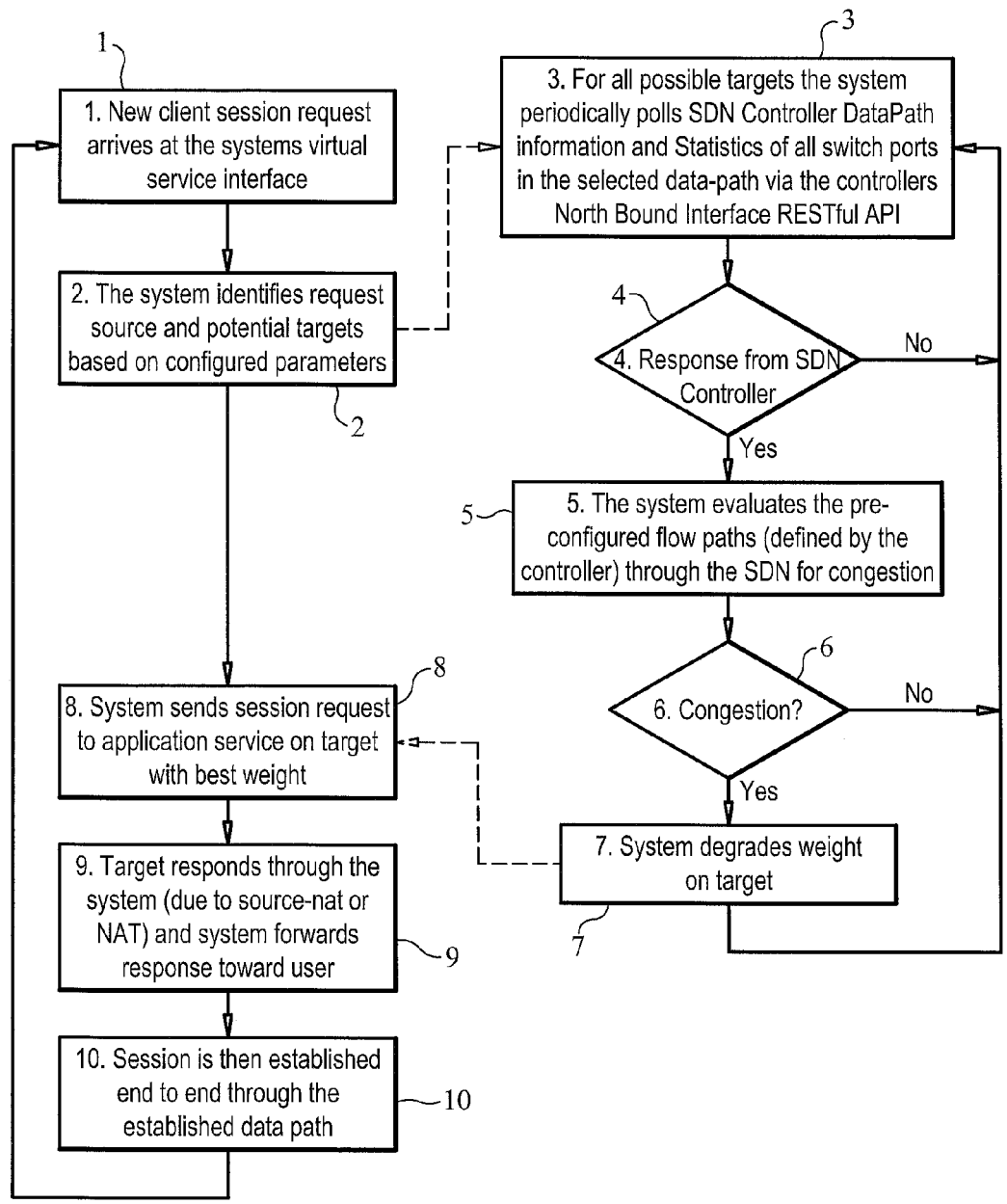
FIG. 15 is a flow chart illustrating the "passive path" method of intelligent data traffic steering formed in accordance with the present invention.

Reference should now be had to FIG. 15 of the drawings, which shows a flow chart illustrating the operation of the system of the present invention in accordance with the "passive path" method. As shown in FIG. 15, and in accordance with the passive path method of the present invention, a user session request arrives at the virtual service interface 22 of the system (Step 1). The system identifies the request source and potential targets (i.e., servers) based on configured parameters, such as destination application information, 5 tuple information and subscriber or tenant ID information (Step 2).

For all possible targets (servers 6), the system periodically polls the SDN controller 4 for data path information and statistical information concerning all of the switch ports (including the egress ports 12 of the network 8) in the selected data path via the controller's North Bound Interface (NBI) RESTful API (Step 3). Then, the system checks if the SDN controller 4 responds within a specific time-out (Step 4).

If the SDN controller 4 did respond, then the system evaluates the pre-configured flow paths that are defined by the SDN controller 4 through the network 8 for congestion (Step 5). The system then checks to see if congestion exists (Step 6).

If path congestion exists, then the system degrades or modifies the weight attributable to an individual target or server 6 (Step 7). The system then sends a session request to the application service on the target or server 6 having the best weight (Step 8).

The target, or server 6, responds through the system (due to source-nat, or NAT) and the system forwards the response toward the user (Step 9). The session is then established end-to-end through the data path of the network 8 determined by the adaptive load balancer 2 of the present invention. (Step 10).

Figure 6:
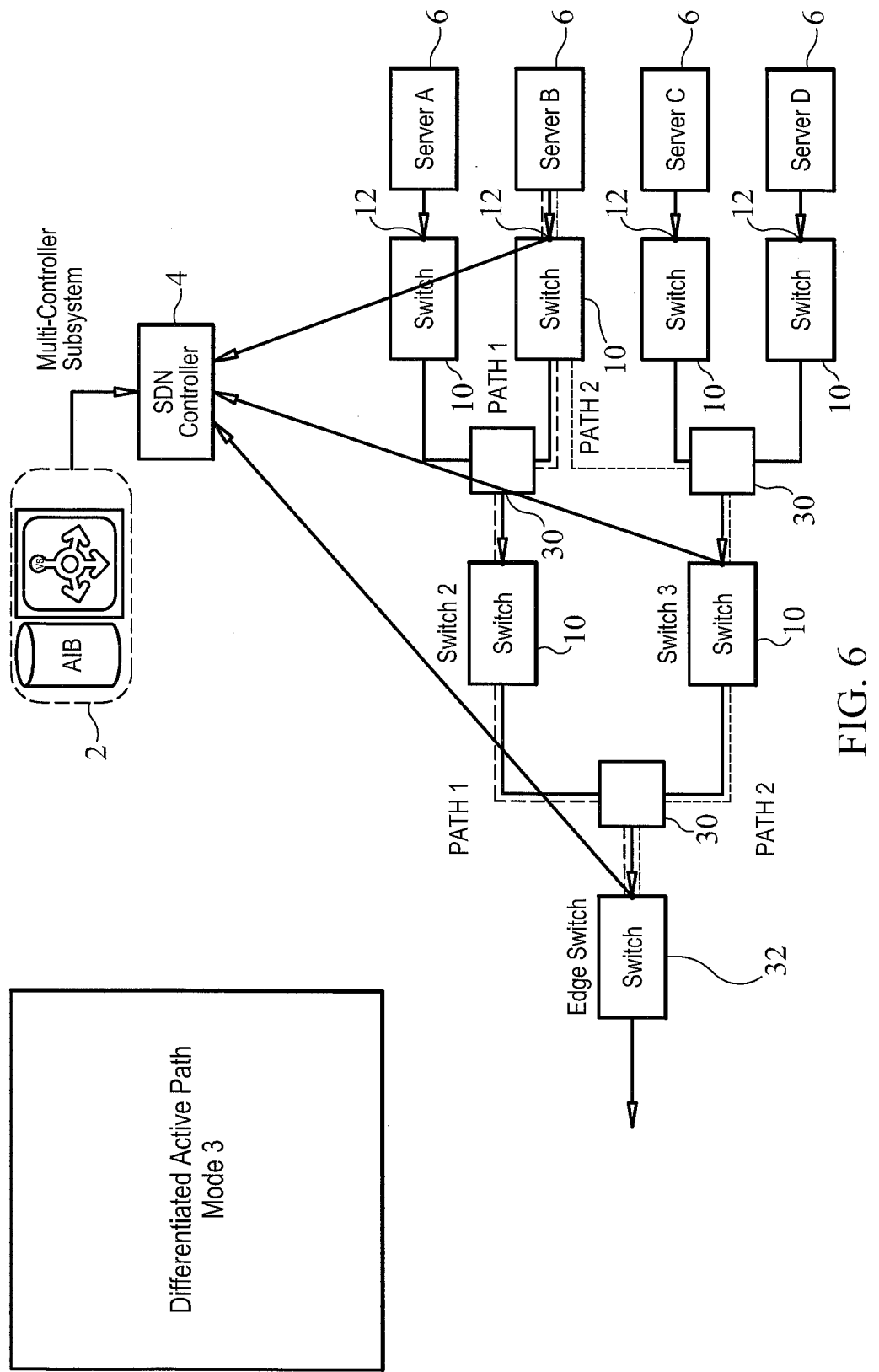
FIG. 6 is a simplified block diagram of a third form of a system constructed in accordance with the present invention which carries out "active path" intelligent traffic steering, referred to in FIG. 3 of the drawings.

A block diagram of a server system having an adaptive load balancer 2 which controls the operation of one or more SDN controllers 4 for carrying out the "active path" method of the present invention is shown in FIG. 6 of the drawings. In situations where multiple (redundant) paths lead to the same server 6, the adaptive load balancer 2 programs the SDN controller 4 to take the most effective route through the server system by installing the flows between the load balancer 2 and the selected server 6. For example, and as illustrated by FIG. 6 of the drawings, there may be multiple paths to get from Server B to edge switch 32. The adaptive load balancer 2 looks at the performance and error metrics of the switches 10 in the server network 8, which indicate the degree of congestion of the paths through the network 8 from the server 6 to the edge switch, and determines in a dynamic fashion the proper path to take along the least congested route from the server to the edge switch 32, and directs the SDN controller 4, or controllers, to control the switches 10 through the server network 8 to realize the selected path.

Figure 16:
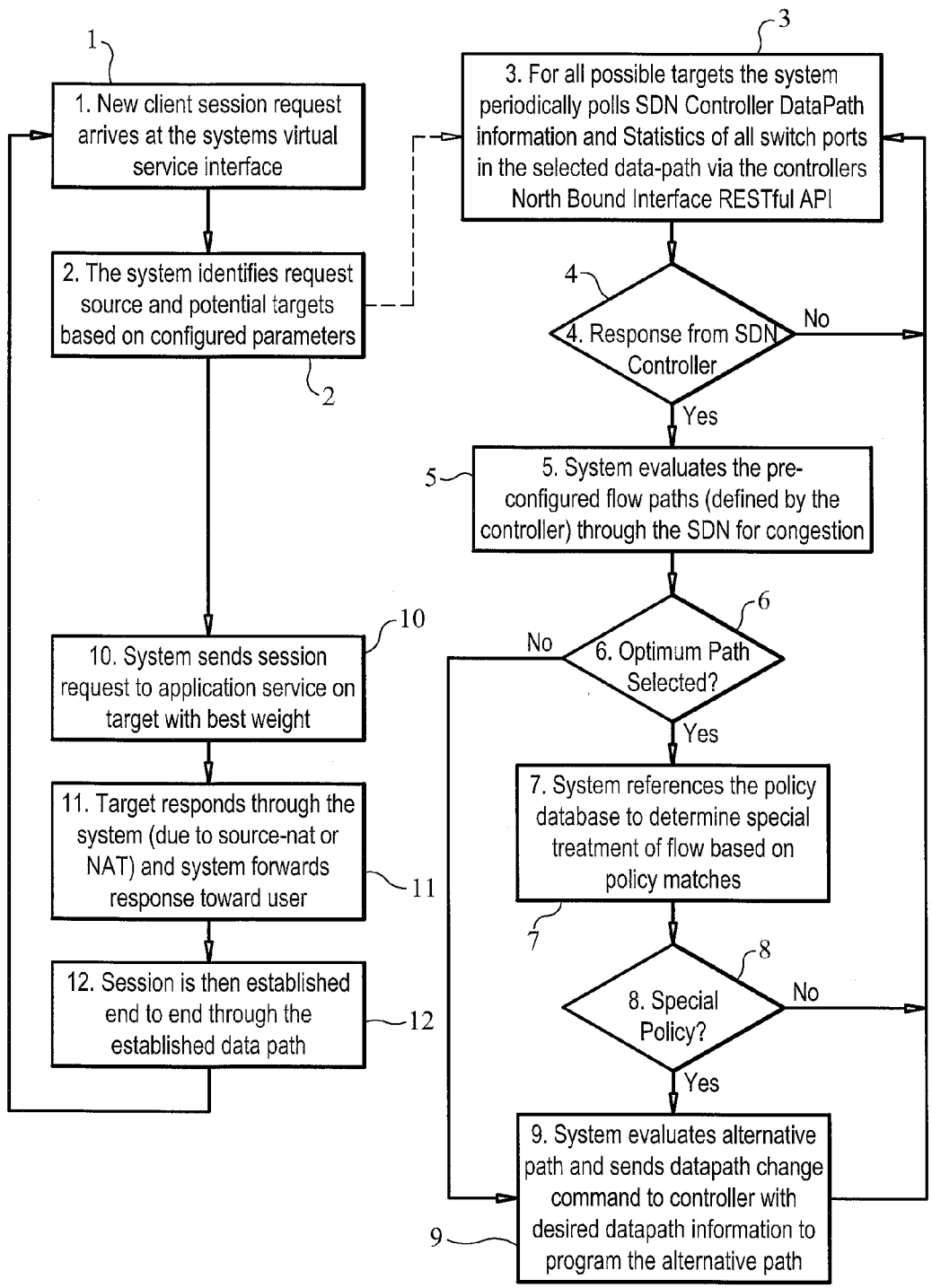
FIG. 16 is a flow chart illustrating the "active path" method of intelligent data traffic steering formed in accordance with the present invention.

Reference should now be had to FIG. 16 of the drawings, which shows a flow chart illustrating the operation of the system of the present invention in accordance with the "active path" method.

As shown in FIG. 16, and in accordance with the active path method of the present invention, a user session request arrives at the virtual service interface 22 of the system (Step 1). The system identifies the request source and potential targets (i.e., servers 6) based on the configured parameters, such as destination application information, 5 tuple information and subscriber or tenant ID information (Step 2).

Then, for all possible targets (i.e., servers 6), the system periodically polls the SDN controller 4 for data path information and statistical information of all of the switch ports (including the network egress ports 12) in the selected data path via the controller's North Bound Interface (NBI) RESTful API (Step 3). The system then checks to see if the SDN controller 4 responds within a specific time-out (Step 4).

If the SDN controller 4 did respond, then the system evaluates the set of possible flow paths through the network 8 (Step 5). The system checks to see if an optimal path is already selected (Step 6).

If an optimal path is selected, then the system references the policy database 20 to determine special treatment of flow based on policy matches (Step 7). The system then checks to see if a special policy matches (Step 8).

If an optimal path or special policy is not selected, then the system evaluates alternative paths and sends a data path change command to the SDN controller 4 with desired data path information to program the alternative path through the network 8 (Step 9).

The system then sends a session request to the application service on the target or server 6 having the best weight (Step 10).

The target or server 6 responds through the system (due to source-nat, or NAT), and the system forwards the response toward the user (Step 11). The session is then established end-to-end through the established data path determined by the adaptive load balancer 2 of the present invention (Step 12).

Figure 7:
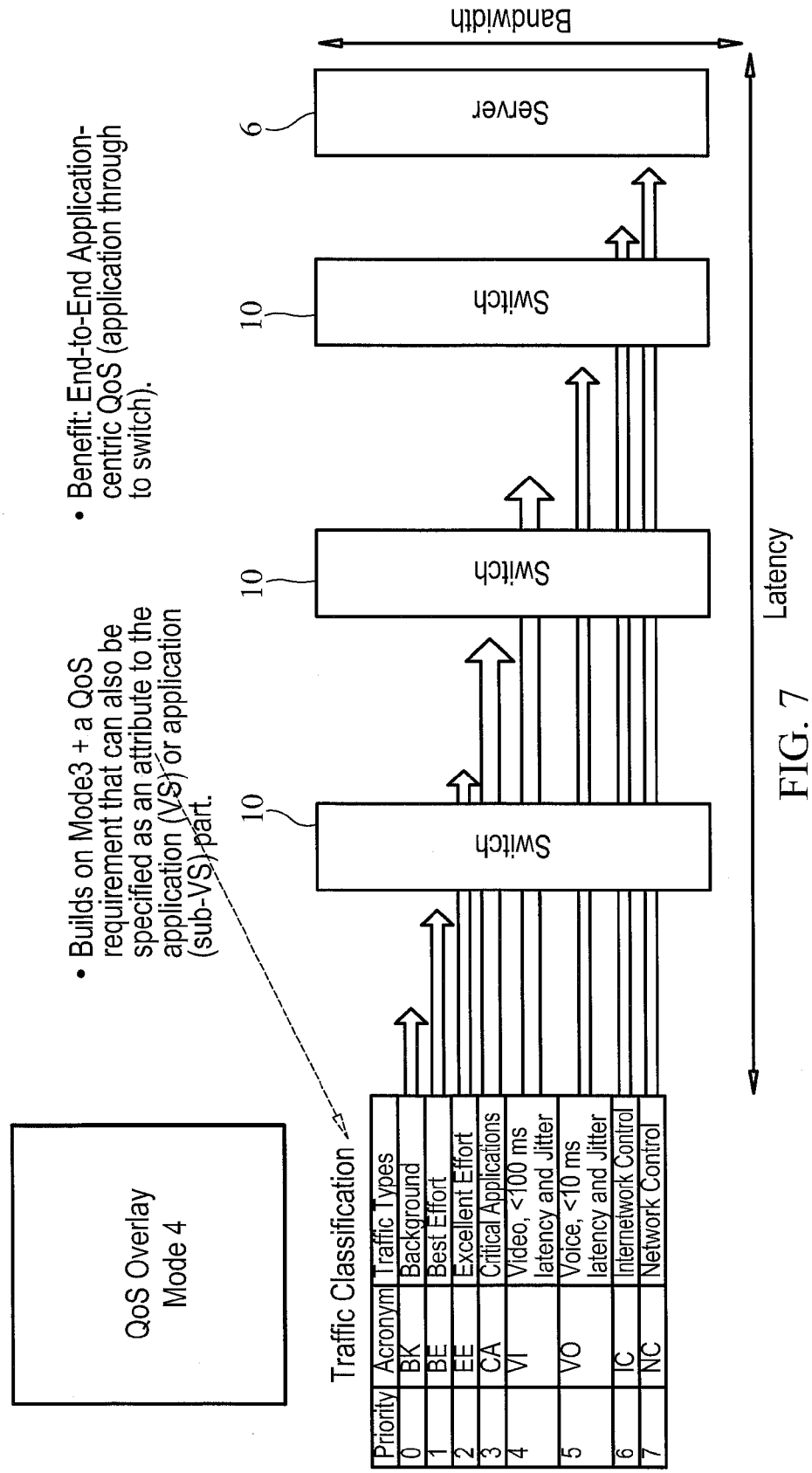
FIG. 7 is a block diagram/chart which depicts a "quality of service (QoS) overlay" method of intelligent traffic steering in accordance with the present invention.

The "QoS overlay" or "automated QoS control" method of the present invention will now be described, and reference should be had to FIGS. 7 and 8 of the drawings in this regard. First, and as shown in FIG. 7 of the drawings, the QoS overlay method builds on the "active path" method with a QoS requirement that can also be specified as an attribute to the application (virtual service) or application part (sub-virtual service). More specifically, the attribute can be in the fowl of one or more traffic classifications (eight are shown in FIG. 7, each having a specific priority for various types of traffic). The benefit of such a method is an end-to-end (application through to the edge switch 32), application-centric QoS control of the series and layers of switches 10 of the server network 8. What is exemplified by FIG. 7 is how layers of switches 10 may be controlled by the adaptive load balancer-SDN controller combination, depending upon the classification of the traffic and the priority assigned thereto.

For example, background traffic having the least priority (priority "0") may demand the least amount of control of the various layers of server switches 10, whereas traffic deemed network control, having the highest priority (priority "7") may be of such an important nature that the adaptive load balancer-SDN controller combination takes steps to insure that the most efficient network flow path through multiple layers of switches 10 to a server 6 is provided. It should be noted herein that the traffic classifications preferably used in the QoS overlay method of the present invention is in accordance with IEEE Standard 802.1P, which defines the Generic Attribute Registration Protocol, although it is envisioned to be within the scope of the present invention that different traffic types and priority attributes may be assigned to the data traffic by the adaptive load balancer 2 of the present invention.

Figure 8:
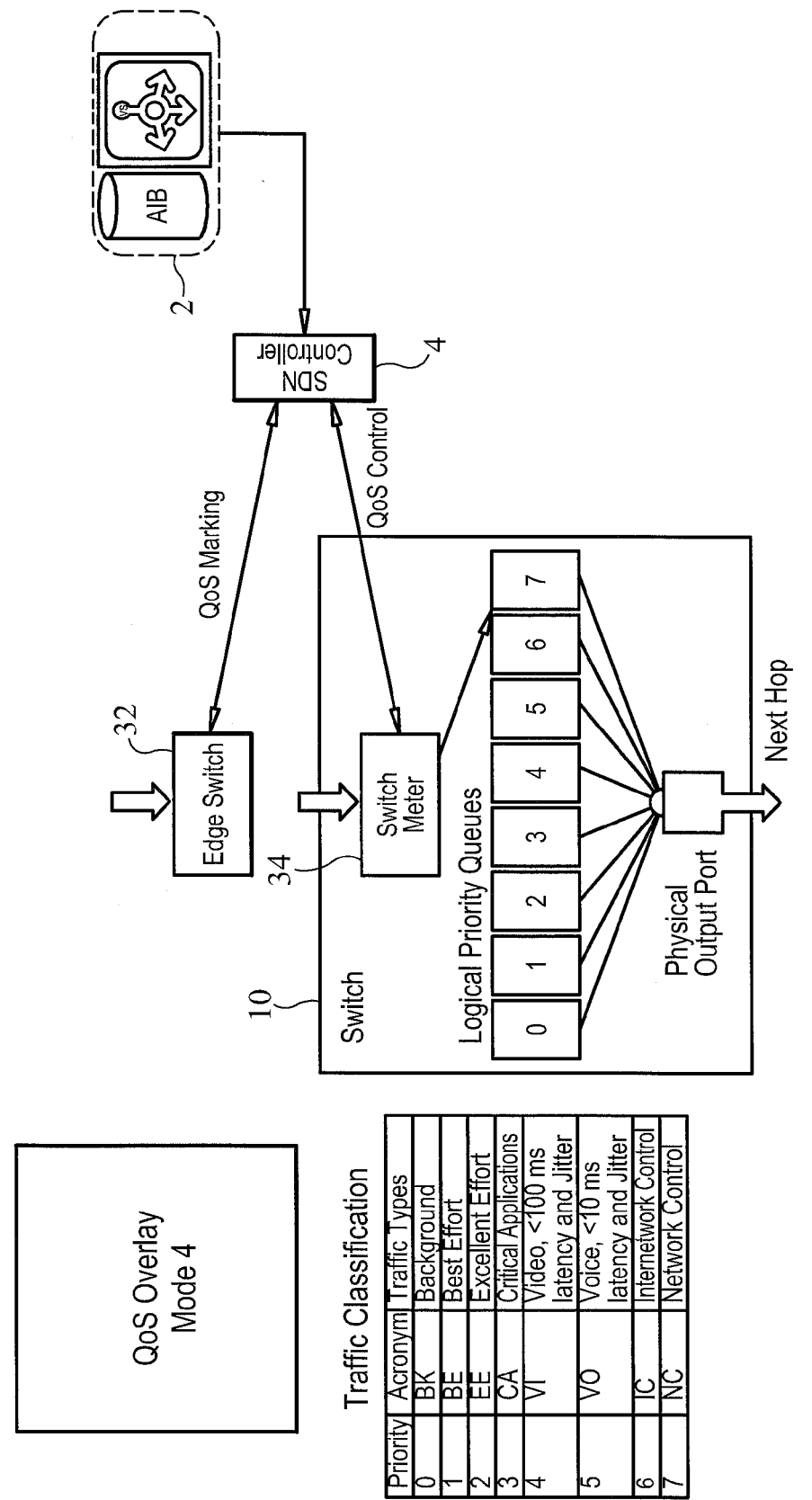
FIG. 8 is a simplified block diagram of a fourth foil of a system constructed in accordance with the present invention which carries out "quality of service (QoS) overlay" intelligent traffic steering, referred to in FIG. 3 of the drawings.

FIG. 8 is a simplified block diagram of a portion of a load balanced server network 8 for implementing the QoS overlay method of intelligent traffic steering of the present invention. Here, and in accordance with the method, the traffic is assigned a QoS marking attribute based on knowledge the adaptive load balancer 2 has by recognizing the traffic or its source. Thus, the first step of the method is to identify and mark the flow of traffic at the incoming edge of the network 8.

Then, the adaptive load balancer 2 determines the priority queue schema of each switch 10 through the SDN controller/OF ("OpenFlow"). Each server switch 10 may have different logical priority queues and may try to direct traffic into one of these priority queues based on its own intelligent decision. The adaptive load balancer 2, on the other hand, may decide a different queue/flow than that decided by the server switch 10, and may instruct the SDN controller 4 to direct the traffic into a different switch queue.

The third step in the method of the present invention is, if the QoS is specified for a particular flow, then the method resorts to OpenFlow meters 34 to identify the flow and add the flow to the appropriate output port of the server switch 10.

The fourth step in the "QoS overlay" method of the present invention is to use the OpenFlow meters 34 to take actions when a flow exceeds the specified rate, drop, or DSCP (Differentiated Services Code Point) remark, and add to an alternative priority queue on the output port of the server switch 10.

Figure 17:
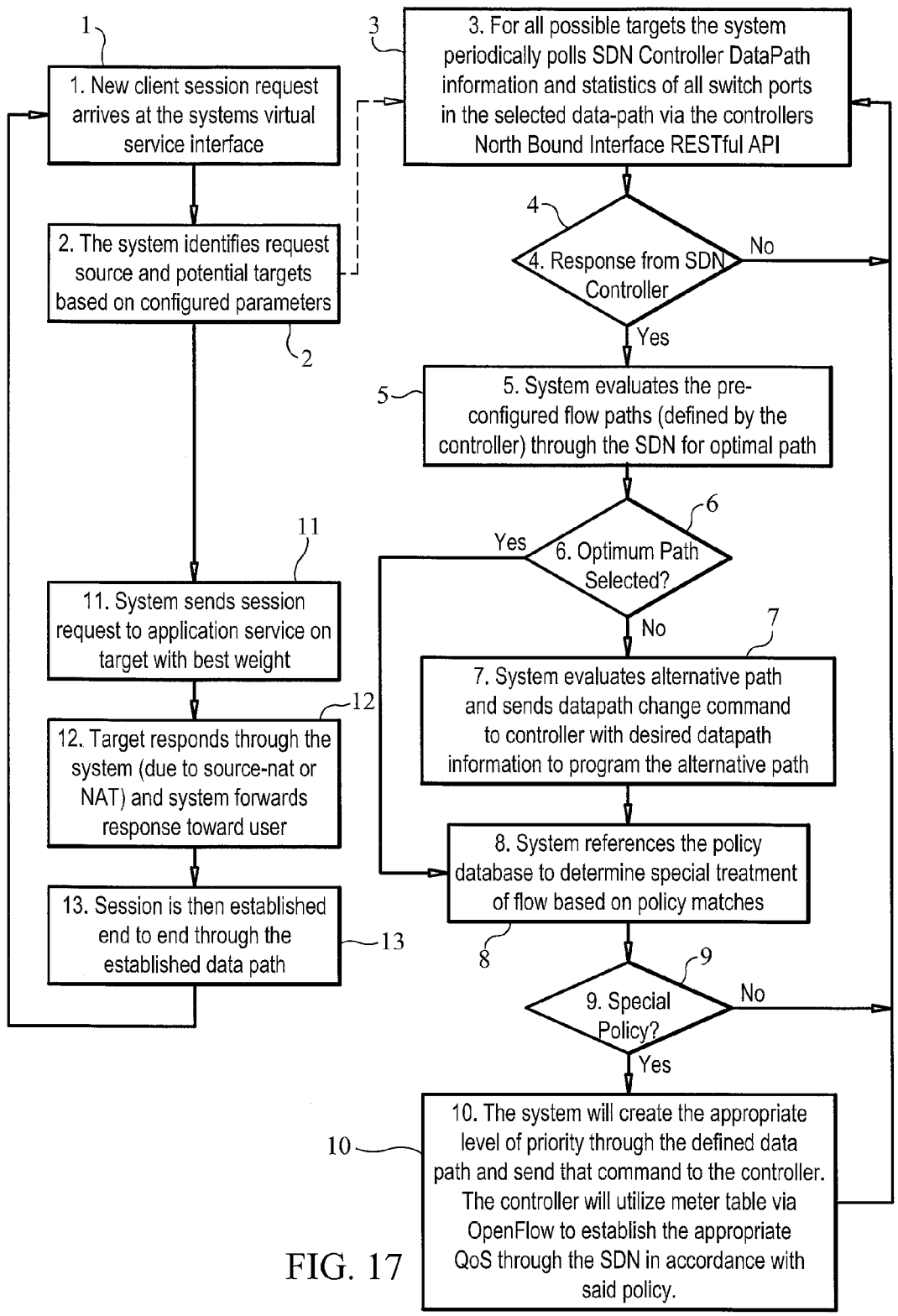
FIG. 17 is a flow chart illustrating the "active path with QoS overlay" method of intelligent data traffic steering formed in accordance with the present invention.

Reference should now be had to FIG. 17 of the drawings, which shows a flow chart illustrating the operation of the system of the present invention in accordance with the "QoS overlay or automated QoS control" method. In accordance with the QoS overlay or automated QoS control method of the present invention, the user session request arrives at the virtual service interface 22 of the system (Step 1). The system identifies the request source and potential targets (i.e., servers 6) based on configured parameters, such as destination application information, 5 tuple information and subscriber or tenant ID information (Step 2).

For all possible targets, or servers 6, the system periodically polls the SDN controller 4 for data path information and statistical information concerning all switch ports (including the egress ports 12 of the network 8) in the selected data path via the SDN controller's North Bound Interface (NBI) RESTful API (Step 3). The system then checks to see if the SDN controller 4 responds within a specific time-out (Step 4).

If the SDN controller 4 did respond, then the system evaluates the set of possible flow paths through the network 8 (Step 5). The system then checks to see if an optimal path is already selected (Step 6).

If an optimal path is not selected, then the system evaluates alternative paths and sends a data path change command to the SDN controller 4 with desired data path information to program the alternative path through the network (Step 7). If an optimal path is selected, then the system references the policy database 20 to determine special treatment of flow based on policy matches (Step 8). The system then checks to see if a special policy matches (Step 9).

If a policy matches, then the system will create the appropriate level of priority through the defined data path and will send that command to the SDN controller 4. The SDN controller 4 will utilize the meter table via OpenFlow to establish the appropriate QoS through the network 8 in accordance with that policy (Step 10). The system then sends a session request to the application service on the target, or server 6, having the best weight (Step 11).

The target or server 6 responds through the system (due to source-nat, or NAT), and the system forwards the response toward the user (Step 12). The session is then established end-to-end through the data path of the network 8 determined by the adaptive load balancer 2 of the present invention (Step 13).

Figure 9:
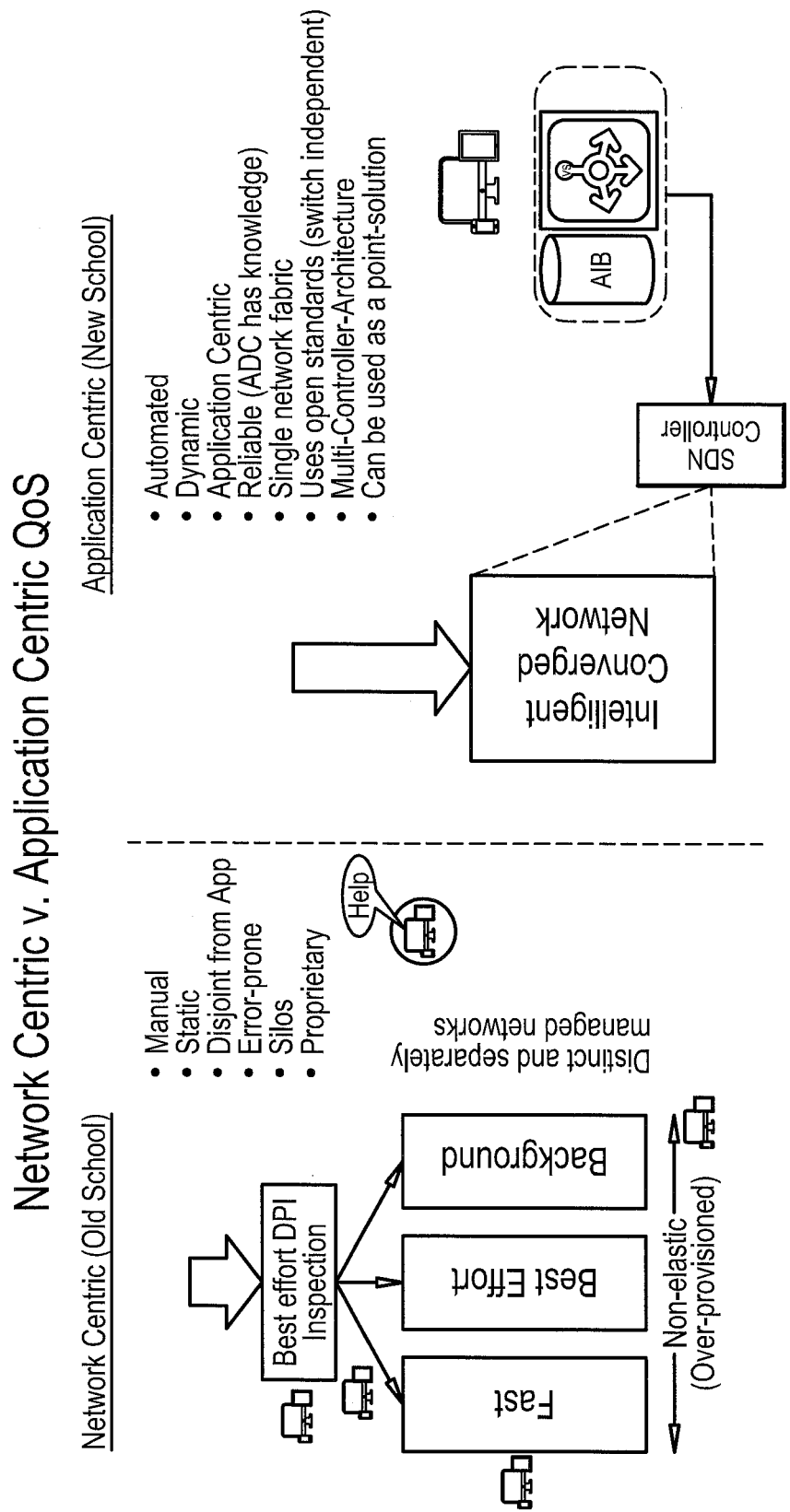
FIG. 9 is a block diagram/depiction of a conventional "network centric" load balancer/server system compared with an "application centric" adaptive load balanced system using a software defined network (SDN) controller for intelligent traffic steering formed in accordance with the present invention.

FIG. 9 is a diagram which compares a conventional "network centric" system to the "application centric" system and method of the present invention. In the conventional system and method, there may be an excessive use of operational resources (e.g., switches, controllers and servers) to handle the traffic, as the system and method operate on a relatively non-intelligent basis. The "network centric" conventional system applies a deep packet inspection (DPI) to determine the quality of service (QoS) in a non-flexible and non-adaptable manner, categorizing the traffic as being fast, best effort or background, for example. Distinct and separately managed networks may be required to accomplish this, resulting in a costly and over-resourced server network.

On the other hand, the "application centric" methods and systems of the present invention described herein employ an intelligent converged, QoS server network 8 controlled by an adaptive load balancer/SDN controller combination. The system is entirely automated, dynamic and reliable (since the load balancer 2 has specific knowledge of the incoming traffic), and uses a single network fabric with switch independent, open standards and multi-controller architecture. The systems and methods of the present invention intelligently direct traffic through the server network 8 in a cost effective and efficient manner.

Further features of the adaptive load balancer of the present invention will now be described.

The adaptive load balancer 2 of the present invention also sets up, and modifies when necessary, an egress port table, and this happens when the load balancer 2 is configured with new target server information. Target servers 6 are administratively configured on a load balancer by specifying the IP address and TCP (or UDP) ports associated with the service being offered. Once such servers 6 are configured, the load balancer 2 sends a series of requests to the designated SDN controller 4 responsible for the network 8 to which the target servers 6 are attached. The SDN controller 4 replies to these requests with unique identifiers for each network port ("egress port" 12) to which each configured target server 6 is attached. These results are recorded in a table that is later used during the periodic polling of the SDN controller 4.

As mentioned previously, the adaptive load balancer 2 periodically polls the SDN controller 4 for statistical information; this dynamically populates the weighted round robin scheduling table 14. Every five seconds, or some other period of time, the load balancer 2 conducts a poll of the designated SDN controller 4 responsible for the network 8 to which the target servers 6 are attached. Each such poll consists of a series of requests directed to the SDN controller 4 and the compilation of replies from the SDN controller 4 to those requests. Each request seeks the unused network bandwidth available associated with one of the network ports 12 enumerated in the egress port table described above.

When a complete set of replies has been received from the SDN controller 4, a calculation is performed to compute new "resulting weight" values for the weighted round robin scheduling table 14. This calculation is performed by multiplying the number representing the base weight of each target server 6 with the number representing the unused network bandwidth associated with the egress port 12 to which the target server 6 is attached. This value is then rounded to the nearest integer and recorded in the weighted round robin scheduling table 14.

In the event a complete set of replies is not received by the load balancer 2 within, for example, five seconds (or within an alternative administratively determined period of time), the current polling cycle terminates without making any updates to the weighted round robin scheduling table 14, and any partial results received are discarded.

The adaptive load balancer 2 of the present invention also sets up new client connections, with target server selection. The load balancer 2 enables clients to access applications located on a plurality of target servers 6 through a single interface called a "Virtual Service" 22. A Virtual Service 22 is the single point of access to target servers 6 contact used by clients. Each Virtual Service 22 is uniquely identified by an administratively configured network address, port number, and IP protocol (TCP or UDP).

When each new client connection request is received at the network interface 22 of the load balancer 2, the load balancer 2 inspects the destination network address, port number, and IP protocol of the request to determine if this set of values matches the configured Virtual Service 22. If no such match can be made, then the request is rejected. If such a match succeeds, then the request is passed to the weighted round robin scheduling module or table 14 to select the best target server 6 for the request.

By way of example, if Target Servers A, B and C have the resulting weight values of 4, 3, and 2, respectively, in the weighted round robin scheduling table 14, then the next nine valid client requests will have target servers 6 designated in the following sequence: AAABABCABC, so long as the values in the weighted round robin scheduling table 14 remain unchanged. The tenth through eighteenth requests will have target servers 6 designated in the same sequence, and so on.

Once a target server 6 is selected for a client connection request, the request is then passed to the server interaction module 26 in the load balancer 2, where the request is modified for relaying to the target server 6. This is done by replacing the source address and source port information from the client with a source address and source port on the load balancer 2, and by replacing the destination address and destination port information from the client with the address and port of the selected target server 6. An entry is made in a Network Address Translation (NAT) table, recording both the original addresses and the modifications made.

The connection request is then placed on the network 8 to reach the selected target server 6. Once received by the target server 6, it is processed and a reply is sent to the load balancer 2 at the source address and source port previously modified by the load balancer 2. When the reply is received at the load balancer 2, the server interaction module 26 consults the NAT table to discover the original addressing associated with this reply. It then reverses all previous changes made to the addressing. The reply packet is then placed on a network to reach the requesting client. A validated connection is then established by the client and the server 6.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. An active path method of intelligent data traffic steering performed by an adaptive load balancer, the adaptive load balancer being operatively coupled to a software defined network (SDN), the network having a plurality of switches and defining a plurality of data paths through the switches, the switches of the plurality of switches having switch ports, a plurality of servers being connected to at least some of the switch ports of the network, the network further having an SDN controller which generates statistical information concerning the network, the SDN controller controlling the state of each switch of the plurality of switches and thereby controlling the data paths through the network, the adaptive load balancer defining a virtual service interface and including a memory having stored therein one or more of information relating to the configured parameters of the servers, information relating to the network, policy information and the statistical information generated by the SDN controller, the adaptive load balancer having a weighted round robin scheduler module which determines weights to be assigned to each server of the plurality of servers connected to the network, the adaptive load balancer further having a policy database in which is stored policy parameters, the active path method comprising the steps of:

receiving a user session request on the virtual service interface of the adaptive load balancer;

identifying by the adaptive load balancer the source of the user session request and potential servers of the plurality of servers to receive the session request based on the configured parameters of the servers;

periodically polling by the adaptive load balancer the SDN controller to obtain by the adaptive load balancer the statistical information generated by the SDN controller, the statistical information relating to the data paths through the network and information concerning the switch ports in the data paths;

determining by the adaptive load balancer whether the SDN controller has responded to the polling directed thereat by the adaptive load balancer within a predetermined period of time;

if the SDN controller has responded to the polling within the predetermined period of time, then receiving and evaluating by the adaptive load balancer the statistical information generated by the SDN controller relating to possible data paths through the network to determine whether an optimal data path is already selected;

if an optimal data path is already selected, then referencing by the adaptive load balancer the policy database to determine whether there is a policy of special treatment of data flow based on policy matches;

if a special policy matches or if an optimal data path through the network has not been selected, then evaluating an alternative data path through the network and transmitting by the adaptive load balancer a data path change command to the SDN controller with desired data path information to program in the SDN controller the selected alternative path;

determining by the adaptive load balancer a server of the plurality of servers having the best weight assigned thereto; and causing by the adaptive load balancer the forwarding of the session request through the network on the selected data path to the server having the best weight assigned thereto, thereby establishing a data path through the network on which the session request may flow.

2. An active path method of intelligent data traffic steering as defined by claim 1, wherein the configured parameters include at least one of destination application information, 5 tuple information and subscriber or tenant identification information.

3. An active path with quality of service (QoS) overlay method of intelligent data traffic steering performed by an adaptive load balancer, the adaptive load balancer being operatively coupled to a software defined network (SDN), the network having a plurality of switches and defining a plurality of data paths through the switches, the switches of the plurality of switches having switch ports, a plurality of servers being connected to at least some of the switch ports of the network, the network further having an SDN controller which generates statistical information concerning the network, the SDN controller controlling the state of each switch of the plurality of switches and thereby controlling the data paths through the network, the load balancer defining a virtual service interface and including a memory having stored therein one or more of information relating to the configured parameters of the servers, information relating to the network, policy information and the statistical information generated by the SDN controller, the adaptive load balancer having a weighted round robin scheduler module which determines weights to be assigned to each server of the plurality of servers connected to the network, the adaptive load balancer further having a policy database in which is stored policy parameters, the active path with QoS overlay method comprising the steps of:

receiving a user session request on the virtual service interface of the adaptive load balancer;

identifying by the adaptive load balancer the source of the user session request and potential servers of the plurality of servers to receive the session request based on the configured parameters of the servers;

periodically polling by the adaptive load balancer the SDN controller to obtain by the adaptive load balancer the statistical information generated by the SDN controller, the statistical information relating to the data paths through the network and information concerning the switch ports in the data paths;

determining by the adaptive load balancer whether the SDN controller has responded to the polling directed thereat by the adaptive load balancer within a predetermined period of time;

if the SDN controller has responded to the polling within the predetermined period of time, then receiving and evaluating by the adaptive load balancer the statistical information generated by the SDN controller relating to possible data paths through the network to determine whether an optimal data path is already selected;

if an optimal data path through the network has not been selected, then evaluating an alternative data path through the network and transmitting a data path change command to the SDN controller with desired data path information to program in the SDN controller the selected alternative path;

if an optimal data path is already selected, then referencing by the adaptive load balancer the policy database to determine whether there is a policy of special treatment of data flow based on policy matches;

if a special policy matches, then creating by the adaptive load balancer the appropriate level of priority through a defined data path and transmitting by the adaptive load balancer a corresponding command relating to the defined data path to the SDN controller to program in the SDN controller the defined data path;

utilizing by the SDN controller a meter table via OpenFlow to establish an appropriate QoS through the network in accordance with the policy;

determining by the adaptive load balancer a server of the plurality of servers having the best weight assigned thereto; and causing by the adaptive load balancer the forwarding of the session request through the network on the defined data path to the server having the best weight assigned thereto, thereby establishing a data path through the network on which the session request may flow.

4. An active path with QoS overlay method of intelligent data traffic steering as defined by claim 3, wherein the configured parameters include at least one of destination application information, 5 tuple information and subscriber or tenant identification information.

* * * * *